United States Patent
Da Palma et al.

(10) Patent No.: US 7,631,104 B2
(45) Date of Patent: Dec. 8, 2009

(54) PROVIDING USER CUSTOMIZATION OF WEB 2.0 APPLICATIONS

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 11/766,139

(22) Filed: Jun. 21, 2007

(65) Prior Publication Data

US 2008/0320168 A1 Dec. 25, 2008

Related U.S. Application Data

(63) Continuation-in-part of application No. 11/765,900, filed on Jun. 20, 2007, which is a continuation-in-part of application No. 11/765,928, filed on Jun. 20, 2007, which is a continuation-in-part of application No. 11/765,962, filed on Jun. 20, 2007.

(51) Int. Cl.
*G06F 15/16* (2006.01)
*G10L 21/00* (2006.01)

(52) U.S. Cl. ................................. 709/246; 704/270

(58) Field of Classification Search ............. 709/246; 704/270
See application file for complete search history.

(56) References Cited

U.S. PATENT DOCUMENTS

| | | | |
|---|---|---|---|
| 6,314,402 B1 | 11/2001 | Monaco et al. |
| 6,324,511 B1 | 11/2001 | Kiraly et al. |
| 6,636,831 B1 | 10/2003 | Profit, Jr. et al. |
| 6,801,604 B2 | 10/2004 | Maes et al. |
| 6,865,599 B2 | 3/2005 | Zhang |
| 7,143,148 B1 | 11/2006 | Hickman et al. |
| 2003/0055884 A1 | 3/2003 | Yuen et al. |
| 2003/0088421 A1 | 5/2003 | Maes et al. |
| 2003/0139928 A1 | 7/2003 | Krupatkin et al. |
| 2003/0177010 A1 | 9/2003 | Locke |
| 2006/0015335 A1 | 1/2006 | Vennelakanti et al. |

OTHER PUBLICATIONS

Fielding, Roy and Taylor, Richard. "Principled Design of the Modern Web Architecture", ACM Transactions on Internet Technology, vol. 2, No. 2, May 2002, pp. 115-150.*

(Continued)

*Primary Examiner*—George C Neurauter, Jr.
(74) *Attorney, Agent, or Firm*—Patents on Demand, PA; Brian K. Buchheit

(57) ABSTRACT

The present invention discloses a solution for user customization of Web 2.0 applications. In the solution, a browser can establish a connection with a Web 2.0 server. The browser can convey user identification information to the Web 2.0 server and request a Web 2.0 application. Based on the conveyed identifying information, a user can be identified. The Web 2.0 server can then query a server-side data store for customizations associated with the identified user and requested application. When customizations exist in the data store, the customizations can be applied to the Web 2.0 application. The customized Web 2.0 application can then be conveyed to the browser. The browser can be a Web browser or a voice browser depending upon implementation specifics.

10 Claims, 4 Drawing Sheets

OTHER PUBLICATIONS

Nottingham, M. and Sayre, R. "Request for Comments (RFC) 4287: The Atom Syndication Format", The Internet Society, Dec. 2005, 43 pages.*

Huang, C.M., et al., "Phone-Web: Accessing WWW using a telephone set", World Wide Web, vol. 2, No. 3, pp. 161-178, 1999.

Freier, J., et al., "WebViews: Accessing Personalized Web Content and Services", Proc. of 10th Int'l Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G., et al., "Mobile refinding of web information using a voice interface: an exploratory study", Proc. of 2005 Latin American Conf. on Human-computer interaction, Cuernavaca, Mexico, pp. 88-99, 2005.

Chang, S.E., et al., "The implementation of a secure and pervasive multimodal Web system architecture", Inf. and Software Tech., vol. 48, No. 6, pp. 424-432, Jun. 2006.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep 30, 2005, [retrieved Nov. 25, 2008] retrieved from the Internet <http://www.oreillynet.com/pub/a/oreilly/tim/news/2005/09/30/what-is-web-20.html>.

* cited by examiner

PROVIDING USER CUSTOMIZATION OF WEB 2.0 APPLICATIONS

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of Web 2.0 applications and, more particularly, to providing user customization of Web 2.0 applications.

2. Description of the Related Art

Web 2.0 applications promote collaboration and information sharing among large groups of users. The fundamental principles of Web 2.0 applications grant end-users (those users other than the originator) the privileges to read, write, and update existing applications, actions traditionally restricted to application developers. Additionally, Web 2.0 applications depend upon the collaborative effort of end-users to provide new content and revise existing content. For example, the entries of WIKIPEDIA, a Web 2.0 encyclopedia application, are created and revised by end-users, allowing information to be added and revised as it becomes available.

This new approach to information sharing and Web communication has dramatically increased the popularity of Web 2.0 applications, such as WIKIs and BLOGs. Conventional Web 2.0 applications have a few shortcomings. One shortcoming is that Web 2.0 applications are currently devoid of an ability to establish personal settings for viewing content. Thus, every user experiences and interacts with a Web 2.0 application in the same manner every time.

Another feature that is lacking in Web 2.0 applications is state memory. State memory permits previous user interactions to have an effect on future interactions. For example, a user can fill in Web form fields during one session, which are automatically filled-in for subsequent sessions. Additionally, state memory preserves user settings from one Web page to another during the same session. For example, an account number and user preferences established in one Web page can be automatically applied to other linked pages.

What is needed is a solution that provides users with a way to store configuration and state-related data for a Web 2.0 application. That is, a solution that allows users of a Web 2.0 application to select and store values for customizable parameters that will allow end-users to have a customized experience with Web 2.0 applications. Additionally, this solution would also store state-related data to further enhance an end-user's experience. Ideally, this solution will also encompass the incorporation and customization of speech-enabled solutions into Web 2.0 applications. No such solution currently exists.

SUMMARY OF THE INVENTION

The present invention discloses a mechanism for capturing and applying user-specific customization settings to Web 2.0 applications. The applications can each be any variety of a Web 2.0 application, such as WIKIs, BLOGs, social networking sites, FOLKSONOMIEs, MASHUPs, and the like. Further, the application can be a speech-enabled application that interfaces with a remote speech processing system. The user-specific customization settings can be captured as entries in a customization profile and/or a state definition file. A customization engine can apply the stored customization settings when a user requests the Web 2.0 application from the Web 2.0 server.

The present invention can be implemented in accordance with numerous aspects consistent with the material presented herein. For example, one aspect of the present invention can include a system that allows end-users to customize Web 2.0 applications. Such a system can include a customization data store configured to store a user customization profile and a state definition profile and a customization engine. The user customization profile and state definition profile can contain customization entries that correspond to entries contained within the Web 2.0 application. These customization entries can be applied to the Web 2.0 application by the customization engine when the Web 2.0 application is served by a Web 2.0 server. Served Web 2.0 applications can be speech-enabled applications that use customizable speech processing components.

Another aspect of the present invention can include a server-side customization data storage area to contain user customizations of Web 2.0 applications. The storage area can include a server-side data store configured to store user-specific customization settings for Web 2.0 applications. The customization settings can be automatically applied to the Web 2.0 application when the application is served by a Web 2.0 server. The customization settings can alter an appearance or a behavior of the Web 2.0 application in a user specified manner. The customizations of the data store can cause markup replacements to occur within the pages served by the Web 2.0 server.

Still another aspect of the present invention can include a method for customizing Web 2.0 applications. This method can begin when a browser establishes a connection with a Web 2.0 server. The browser can convey user identification information to the Web 2.0 server and request a Web 2.0 application. Based on the conveyed identifying information, a user can be identified. The Web 2.0 server can then query a server-side data store for customizations associated with the identified user and requested application. When customizations exist in the data store, the customizations can be applied to the Web 2.0 application. The customized Web 2.0 application can then be conveyed to the browser. The browser can be a Web browser or a voice browser depending upon implementation specifics.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
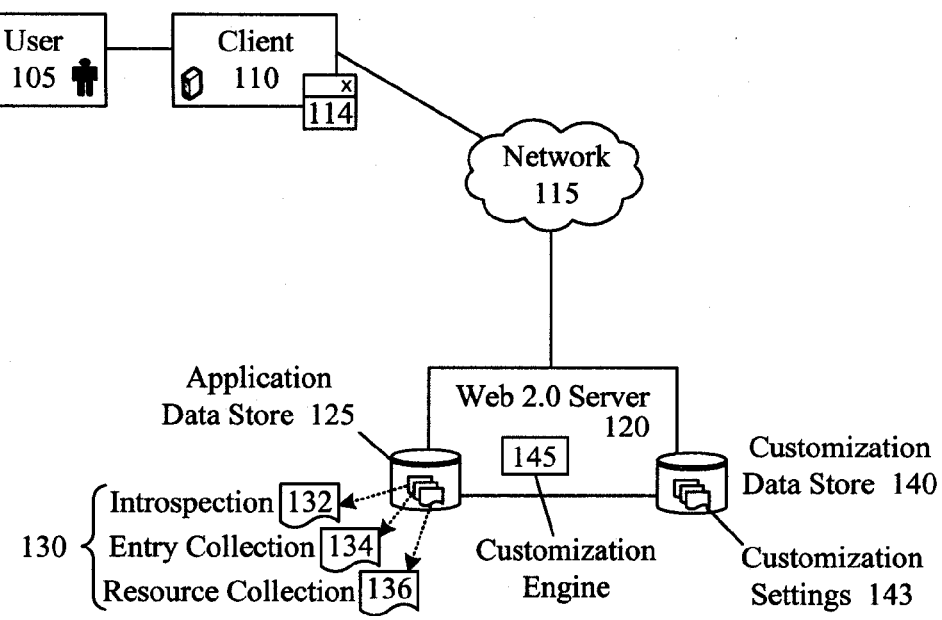
FIG. 1 is a schematic diagram of a system that provides for user customization of Web 2.0 applications in accordance with an embodiment of the inventive arrangements disclosed herein.

FIG. 1 is a schematic diagram of a system 100 that provides for user customization of Web 2.0 applications in accordance with an embodiment of the inventive arrangements disclosed herein. In system 100, a user 105 can use an interface 114 of client 110 to communicate with a Web 2.0 server 120 over network 115. Client 110 can be a variety of electronic devices and can use various associated communication protocols. For example, when the client 110 is a basic computing device (e.g., a personal computer), the interface 114 can be a browser which communicates using the appropriate Web 2.0 conventions, such as HyperText Transfer Protocol (HTTP). When the client 110 is a telephone, the interface 114 can be a voice browser which communicates using VoiceXML messages.

Web 2.0 server 120 can provide Web content to interface 114 and which permits a user 105 to provide additional Web content which is made available to other users. The Web 2.0 server 120 can be a WIKI server, a BLOG server, MASHUP server, a FOLKSONOMY server, a social networking server, and the like. The Web 2.0 server 120 can include an application data store 125, a customization data store 140, and a customization engine 145. The application data store 125 can contain the Web 2.0 applications that can be requested by and served to the user 105. The application data store 125 can include Web 2.0 applications that can be represented as a set of documents 130, such as introspection documents 132, entry collection documents 134, and resource collection documents 136. These documents 130 can be written in accordance with an Atom Publishing Protocol (APP) specification. The Web 2.0 applications can be speech-enabled applications capable of receiving speech input and providing speech output.

The customization engine 145 can be a software component that queries the customization data store 140 for customization settings 143 associated with the user 105 request. These customization settings 143 can be used by the customization engine 145 to modify entries of the documents 130 defining a Web 2.0 application contained in the application data store 125. Once the settings 143 are applied, the Web 2.0 server 120 can convey the customized Web 2.0 application back to the interface 114.

In another contemplated embodiment, the customization data store 140 and customization engine 145 can be located on another server (not shown) communicatively linked with the Web 2.0 server 120.

In another embodiment, a middleware server (not shown) can be used as an interface for managing disparate communication systems. For example, a middleware server can be used to bridge a telephony system with a computer network system.

As used herein, presented data stores, including stores 125 and 140, can be a physical or virtual storage space configured to store digital information. Data stores 125 and 140 can be physically implemented within any type of hardware including, but not limited to, a magnetic disk, an optical disk, a semiconductor memory, a digitally encoded plastic memory, a holographic memory, or any other recording medium. Each of the data stores 125 and 140 can be a stand-alone storage unit as well as a storage unit formed from a plurality of physical devices. Additionally, information can be stored within data store 125 and 140 in a variety of manners. For example, information can be stored within a database structure or can be stored within one or more files of a file storage system, where each file may or may not be indexed for information searching purposes. Further, data stores 125 and/or 140 can utilize one or more encryption mechanisms to protect stored information from unauthorized access.

Network 115 can include any hardware/software/and firmware necessary to convey data encoded within carrier waves. Data can be contained within analog or digital signals and conveyed though data or voice channels. Network 115 can include local components and data pathways necessary for communications to be exchanged among computing device components and between integrated device components and peripheral devices. Network 115 can also include network equipment, such as routers, data lines, hubs, and intermediary servers which together form a data network, such as the Internet. Network 115 can also include circuit-based communication components and mobile communication components, such as telephony switches, modems, cellular communication towers, and the like. Network 115 can include line based and/or wireless communication pathways.

Figure 2:
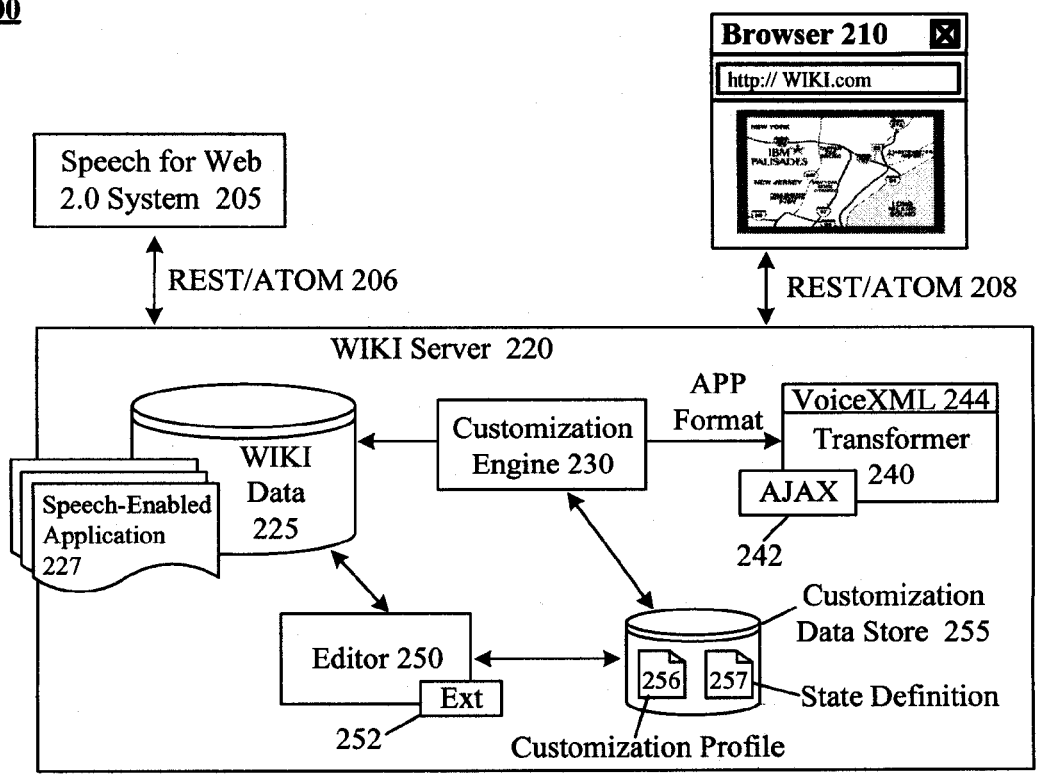
FIG. 2 is a schematic diagram illustrating a specific embodiment of a Web 2.0 server that provides user customization of speech-enabled Web 2.0 applications in accordance with an embodiment of the inventive arrangements disclosed herein.

FIG. 2 is a schematic diagram 200 illustrating a specific embodiment of a Web 2.0 server that provides user customization of speech-enabled Web 2.0 applications in accordance with an embodiment of the inventive arrangements disclosed herein. Although a WIKI server 220 is illustrated, server 220 can be any WEB 2.0 server (e.g., server 120 of system 100) including, but not limited to, a BLOG server, a MASHUP server, a FOLKSONOMY server, a social networking server, and the like.

In the system illustrated by FIG. 2, a browser 210 can communicate with WIKI server 220 via a Representational State Transfer (REST) architecture/ATOM 208 based protocol. The WIKI server 220 can communicate with system 205 via a REST/ATOM 206 based protocol. Protocols 206, 208 can include HTTP and similar protocols that are RESTful by nature as well as an Atom Publishing Protocol (APP) or other protocol that is specifically designed to conform to REST principles.

The server 220 can include a data store 225 in which speech-enabled applications 227 are stored. In one embodiment, the speech-enabled applications 227 can be written in a WIKI syntax contained in an APP format.

The contents of a speech-enabled application 227 can be accessed using editor 250. The editor 250 can be a standard WIKI editor having a voice plug-in or extensions 252. Modifications made to the speech-enabled application 227 via the editor 250 can be stored in customization data store 255 as a customization profile 256 and/or a state definition 257.

The customization profile 256 and state definition 257 can contain customization settings that can override entries contained within the original application 227. The contents of the customization profile 256 and/or state definition 257 can be stored as modifications to and/or deltas from the original application 227 in an APP based format. The invention is not to be construed as limited in this regard and formats other than an APP format can be used.

The customization engine 230 can apply the contents of the customization profile 256 and/or state definition 257 to the speech-enabled application 227. Once the application 227 is customized, the customization engine 230 can convey the customized application 227 to the transformer 240.

The transformer 240 can convert WIKI syntax into standard markup for browsers. In one embodiment, the transformer 240 can be an extension of a conventional transformer that supports HTML and XML. The extended transformer 240 can be enhanced to handle JavaScript, such as AJAX. For example, resource links of application 227 can be converted into AJAX functions by the transformer 240 having an AJAX plug-in 242. The transformer 240 can also include a VoiceXML plug-in 244, which generates VoiceXML markup for voice-only clients.

Figure 3:
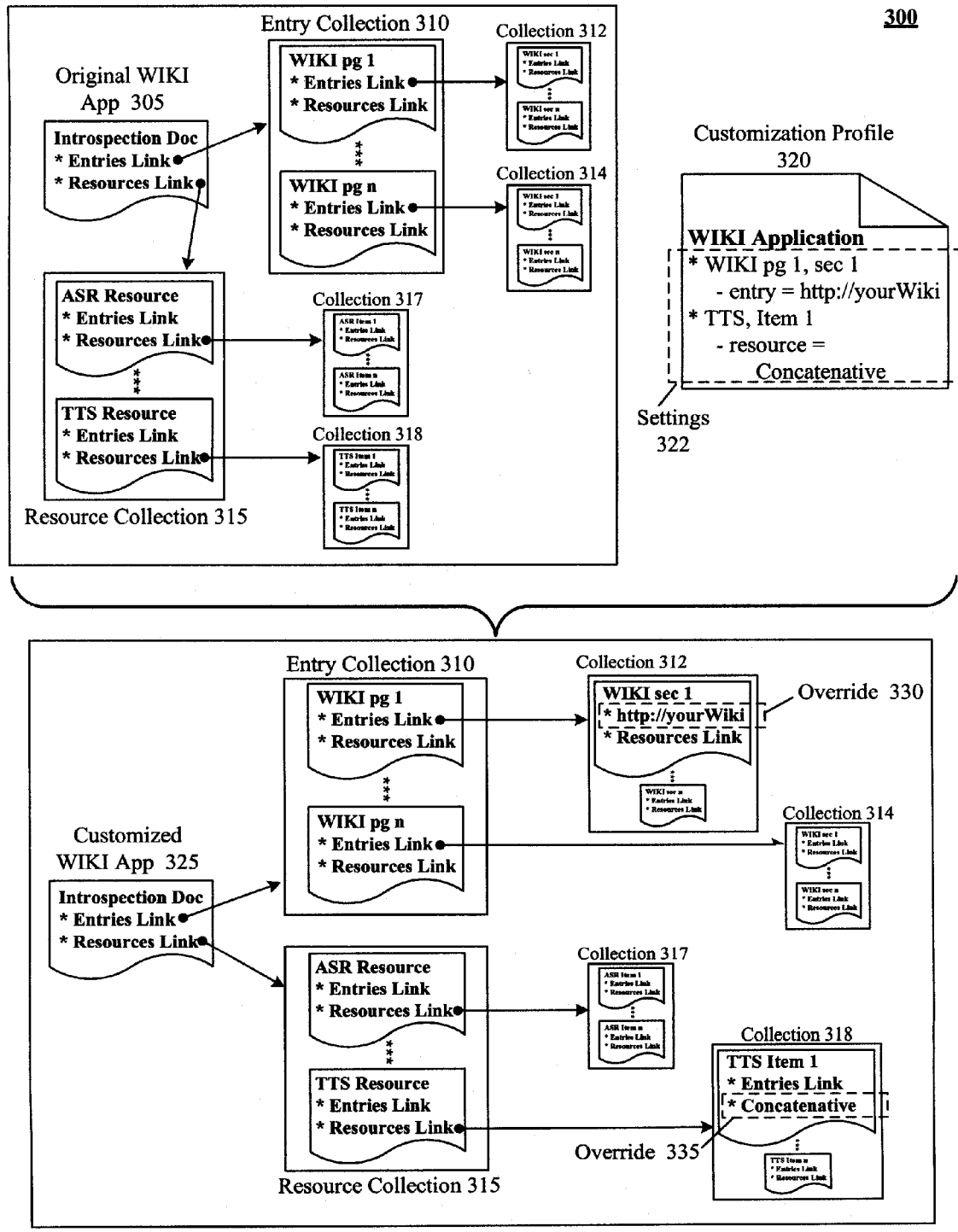
FIG. 3 is a diagram depicting an application of user-specific customization settings to a Web 2.0 application in accordance with an embodiment of the inventive arrangements disclosed herein

FIG. 3 is a diagram 300 depicting an application of user-specific customization settings to a Web 2.0 application 305 in accordance with an embodiment of the inventive arrangements disclosed herein. The application of customization settings shown in diagram 300 can be performed in the context of systems 100 and/or 200 or any other Web 2.0 system allowing user customization of Web 2.0 applications.

In diagram 300, the contents of the customization profile 320 can be applied to an original WIKI application 305. It should be noted that although this example uses a WIKI application 305, the invention is not limited to WIKI applications and can utilize any type of Web 2.0 application.

As shown in this example, the introspection document of the original WIKI application 305 can contain links to a collection of entries 310 and a collection of resources 315. The entries 310 can specify a set of WIKI pages. Each WIKI page (entry 310) can be further decomposed into collections 312-314 having a lower level of granularity, such as WIKI page sections. The resources 315 can include speech processing resources and their particulars, such as ASR resources, TTS resources, SIV resources, VoiceXML interpreter resources, and the like. Each resource 315 can be further decomposed into configurable resource specifics 317-318, such as a speech recognition grammar (for a related WIKI page), a recognition language, and the like.

The customization profile 320 can include customization settings 322 for a specified Web 2.0 application, such as WIKI application 305. As shown in this example, the settings 322 can define the location within the application and a value for an entry to replace at the specified location. In this example, the customization settings 322 define a Universal Resource Identifier (URI), "http://yourWiki", to replace the entry of WIKI page 1, section 1, and a definitive value, "concatenative" to replace the resource entry of TTS, Item 1.

Application of the customization settings 322 to the original WIKI application 305 can result in a customized WIKI application 325. As shown in this example, the composition of the customized application 325 remains unaltered. That is, the presence and linking of the collections 310-318 are unchanged. However, the entries specified in the customization profile 320 can be replaced with the values contained in the customization settings 322.

To illustrate the application of the customization settings 322, the modified areas have been enlarged. Section 1 of collection 312 now contains override 330, which corresponds to the value specified in the customization profile 320. Likewise, collection 318 now contains override 335.

As shown in this example, the customization settings 322 can contain values that can modify the performance of a speech processing system. In this example, override 335 specifies for the speech processing system to use a concatenative method for performing text-to-speech (TTS) operations. It should be emphasized that this level of control and customization for speech processing functions has traditionally been reserved only for developers of speech-enabled applications and has not been accessible to end-users.

It should also be noted that the application of customization settings 322 shown in this example can also apply to settings contained within a state definition file, which can also contain similar customization settings.

Figure 4:
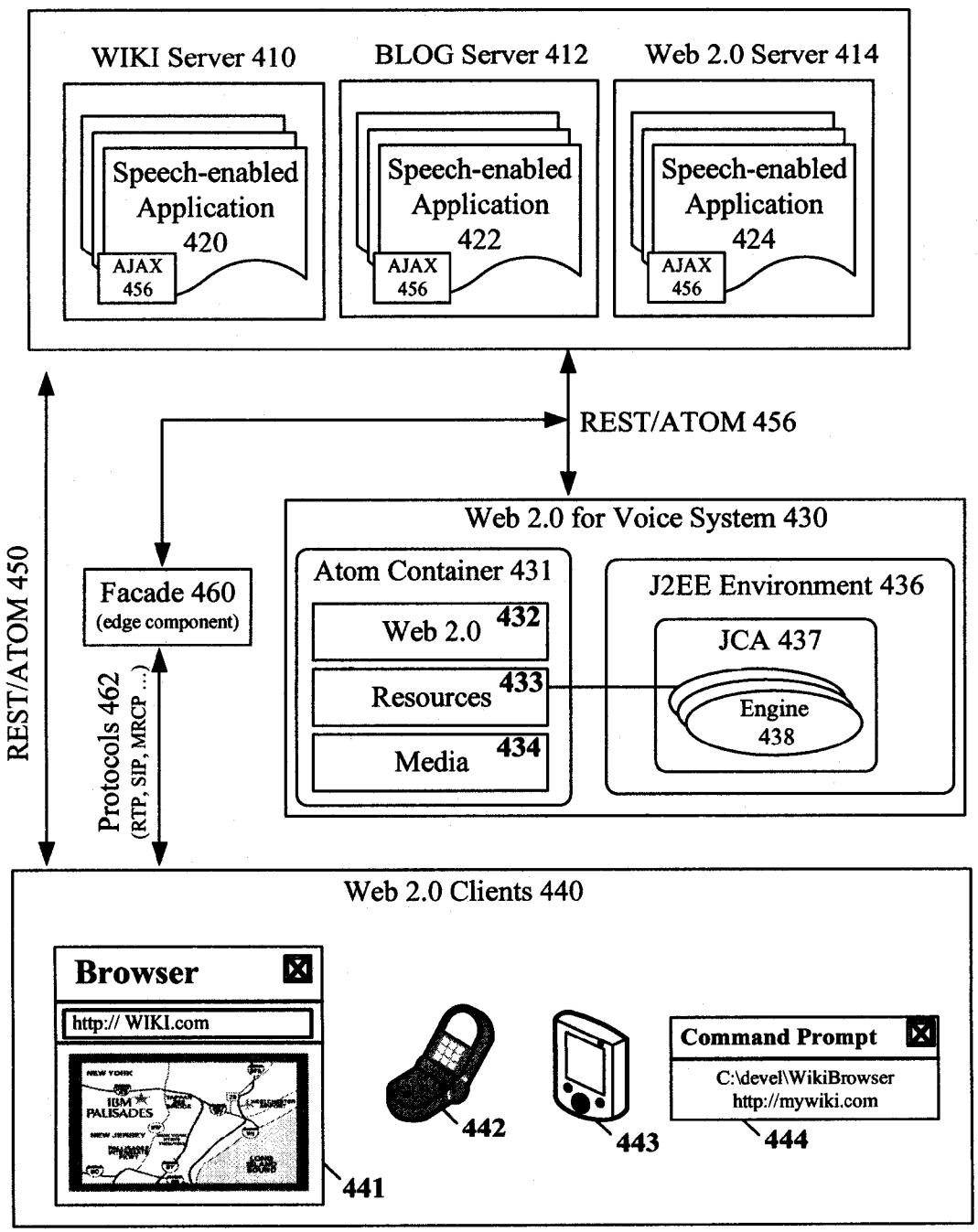
FIG. 4 is a schematic diagram showing a WIKI server adapted for communications with a Web 2.0 for voice system in accordance with an embodiment of the inventive arrangements disclosed herein.

FIG. 4 is a schematic diagram of a system 400 for a Web 2.0 for voice system 430 in accordance with an embodiment of the inventive arrangements disclosed herein. System 400 can be an alternative representation and/or an embodiment for the system 100 of FIG. 1 or for a system that provides approximately equivalent functionality as system 100 utilizing Web 2.0 concepts to provide speech processing capabilities.

In system 400, Web 2.0 clients 440 can communicate with Web 2.0 servers 410-414 utilizing a REST/ATOM 450 protocol. The Web 2.0 servers 410-414 can serve one or more speech-enabled applications 420-424, where speech resources are provided by a Web 2.0 for Voice system 430. One or more of the speech-enabled applications 420-424 can include AJAX 456 or other JavaScript code. In one embodiment, the AJAX 456 code can be automatically converted from WIKI or other syntax by a transformer of a server 410-414.

Communications between the Web 2.0 servers 410-414 and system 430 can be in accordance with REST/ATOM 456 protocols. Each speech-enabled application 420-424 can be associated with an atom container 431, which specifies Web 2.0 items 432, resources 433, and media 434. One or more resource 433 can correspond to a speech engine 438.

The Web 2.0 clients 440 can be any client capable of interfacing with a Web 2.0 server 410-414. For example, the clients 440 can include a Web or voice browser 441 as well as any other type of interface 444, which executes upon a computing device. The computing device can include a mobile telephone 442, a mobile computer 443, a laptop, a media player, a desktop computer, a two-way radio, a line-based phone, and the like. Unlike conventional speech clients, the clients 440 need not have a speech-specific interface and instead only require a standard Web 2.0 interface. That is, there are no assumptions regarding the client 440 other than an ability to communicate with a Web 2.0 server 410-414 using Web 2.0 conventions.

The Web 2.0 servers 410-414 can be any server that provides Web 2.0 content to clients 440 and that provides speech processing capabilities through the Web 2.0 for voice system 430. The Web 2.0 servers can include a WIKI server 410, a BLOG server 412, a MASHUP server, a FOLKSONOMY server, a social networking server, and any other Web 2.0 server 414.

The Web 2.0 for voice system 430 can utilize Web 2.0 concepts to provide speech capabilities. A server-side interface is established between the voice system 430 and a set of Web 2.0 servers 410-414. Available speech resources can be introspected and discovered via introspection documents, which are one of the Web 2.0 items 432. Introspection can be in accordance with the APP specification or a similar protocol. The ability for dynamic configuration and installation is exposed to the servers 410-414 via the introspection document.

That is, access to Web 2.0 for voice system 430 can be through a Web 2.0 server that lets users (e.g., clients 440) provide their own customizations/personalizations. Appreciably, use of the APP 456 opens up the application interface to speech resources using Web 2.0, JAVA 2 ENTERPRISE EDITION (J2EE), WEBSPHERE APPLICATION SERVER (WAS), and other conventions rather than being restricted to protocols, such as media resource control protocol (MRCP), real time streaming protocol (RTSP), or real time protocol (RTP).

The Web 2.0 for Voice system 430 is an extremely flexible solution that permits users (of clients 440) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 438 can be provided from a J2EE environment 436, such as a WAS environment. This environment 436 can conform to a J2EE Connector Architecture (JCA) 437.

In one embodiment, a set of additional facades 460 can be utilized on top of Web 2.0 protocols to provide additional interface and protocol 462 options (e.g., MRCP, RTSP, RTP, Session Initiation Protocol (SIP), etc.) to the Web 2.0 for voice system 430. Use of facades 460 can enable legacy access/use of the Web 2.0 for voice system 430. The facades 460 can be designed to segment the protocol 462 from underlying details so that characteristics of the facade do not bleed through to speech implementation details. Functions, such as the WAS 6.1 channel framework or a JCA container, can be used to plug-in a protocol, which is not native to the J2EE environment 436. The media component 434 of the container 431 can be used to handle media storage, delivery, and format conversions as necessary. Facades 460 can be used for asynchronous or synchronous protocols 462.

Figure 5:
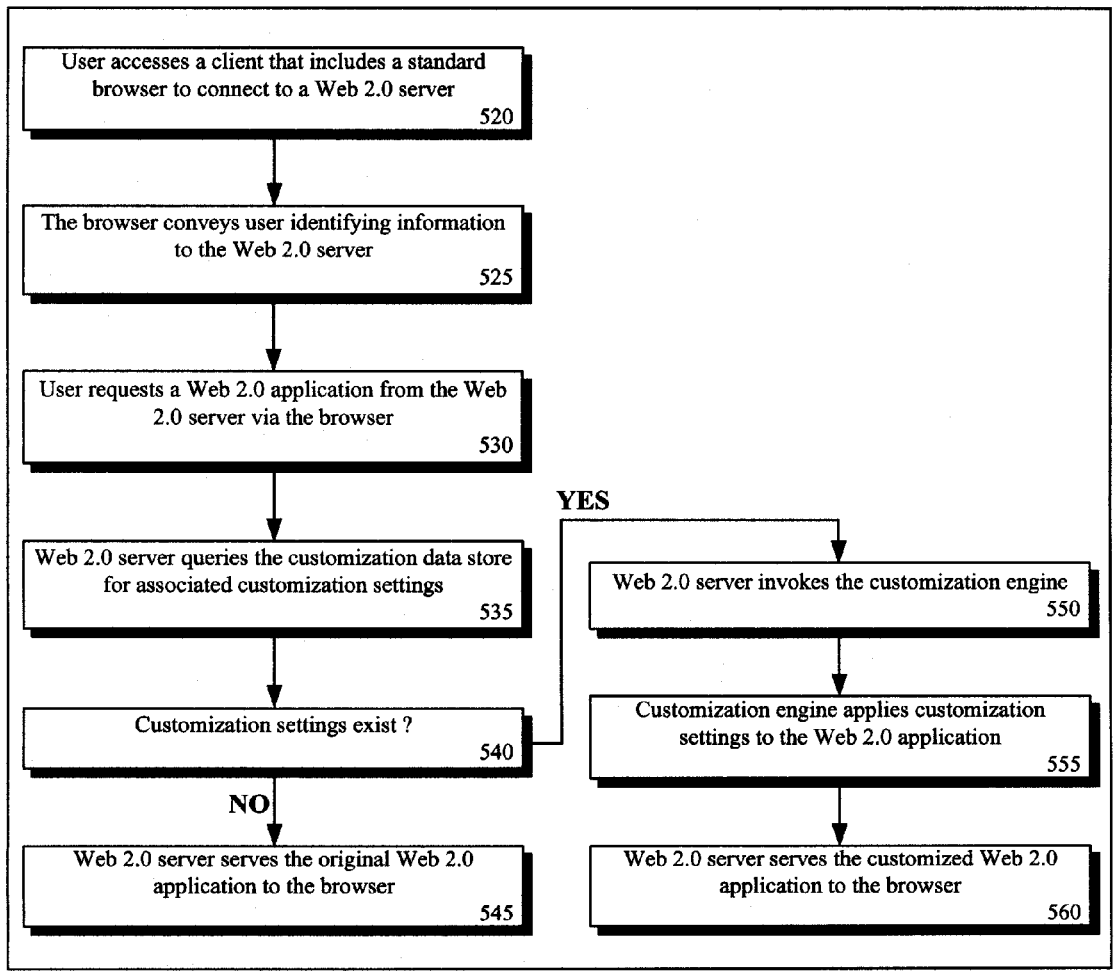
FIG. 5 is a flow diagram illustrating an environment for creating and applying user-specific customization settings to Web 2.0 applications in accordance with an embodiment of the inventive arrangements disclosed herein.

FIG. 5 is a flow diagram illustrating an environment 505 for creating and applying user-specific customization settings 519 to Web 2.0 applications 515 in accordance with an embodiment of the inventive arrangements disclosed herein. As illustrated in environment 505, an end-user 510 can use a Web browser 512 to request Web 2.0 applications 515 from a Web 2.0 server 514. The Web 2.0 server 514 can access user-specific customizations 519 contained within a customization data store 518 and utilize a customization engine 516 to apply the settings 519 to the requested application 515. Communication between the components illustrated in environment 505 can be conveyed over a network (not shown).

It should be noted that environment 505 and its components can be expanded to encompass speech processing capabilities for speech-enabled Web 2.0 applications, such as those illustrated in system 200 of FIG. 2.

The method of FIG. 5, which includes steps 520-560, can be performed in the context of environment 505. The method can begin in step 520, where a user can establish a connection to a Web 2.0 server by accessing a client that includes a standard Web browser. In step 525, the browser can convey information to the Web 2.0 server that identifies the user.

The user can then request a Web 2.0 application from the Web 2.0 server via the browser in step 530. In step 535, the Web 2.0 server can query the customization data store for customization settings that are associated with the identified user and requested application. The existence of customization settings can be determined in step 540. An absence of customization settings associated with the identified user and requested application can execute step 545, in which the Web 2.0 server serves the Web 2.0 application in its original format to the browser.

When customization exists, step 550 can be executed, in which the Web 2.0 server can invoke a customization engine. In step 555, the customization engine can apply the customization settings to the requested Web 2.0 application. The Web 2.0 server can then serve the customized application to the browser in step 560.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for providing user customization of Web 2.0 applications comprising:
   a processor and memory;
   a user customization profile configured to contain one or more customization entries, wherein the one or more customization entries define an override value for a corresponding entry in a Web 2.0 application;
a state definition file containing at least one state entry, wherein each state entry defines a static value for a corresponding entry in the Web 2.0 application;
a customization data store configured to store the user customization profile and state definition file; and
a customization engine configured to apply the entries of the user customization profile and state definition file to the Web 2.0 application when the Web 2.0 application is served by a Web 2.0 server,
wherein the Web 2.0 application conforms to an Atom Publishing Protocol (APP) specification, and wherein the Web 2.0 application comprises an introspection document, a collection of entries, and a collection of resources, each of which conforms to the APP specification, wherein the applied user-specific customizations represent a modification to at least one of the entries and resources, and
wherein the Web 2.0 application is a speech-enabled application, and wherein at least one of the resources is a speech processing resource linked to a speech processing engine remotely located from the Web 2.0 server that serves the speech-enabled application, said speech processing engine providing a speech processing capability for the speech-enabled Web 2.0 application, and wherein at least one of the applied user-specific customizations is a speech processing customization that affects a manner in which the speech processing engine performs a speech processing task.

2. The system of claim 1, further comprising:
an editor interface configured to allow an end-user to modify the Web 2.0 application, wherein the modification of the application is saved in the user customization profile, said editor interface being further configured to allow the end-user to define an application state, wherein the application state is saved in the state definition file.

3. The system of claim 2, wherein the modification of the Web 2.0 application is denoted by a unique identifier of a markup language in which the Web 2.0 application is written.

4. The system of claim 1, wherein the Web 2.0 application is one of a WIKI, a BLOG, a MASHUP, a social networking application, and a FOLKSONOMY.

5. The system of claim 4, wherein the Web 2.0 application is written in conformance with a Representational State Transfer (REST) architecture.

6. A server-side data storage area contained on a recording medium for user customizations of Web 2.0 applications comprising:
a server-side customization data store configured to store user-specific customization settings for a Web 2.0 application, wherein, when the Web 2.0 application is served to a user by a Web 2.0 server, settings associated with the user are automatically applied to the served application,
wherein the Web 2.0 application conforms to an Atom Publishing Protocol (APP) specification, and wherein the Web 2.0 application comprises an introspection document, a collection of entries, and a collection of resources, each of which conforms to the APP specification, wherein the applied user-specific customization settings represent a modification to at least one of the entries and resources, and
wherein the Web 2.0 application is a speech-enabled application, and wherein at least one of the resources is a speech processing resource linked to a speech processing engine remotely located from the Web 2.0 server that serves the speech-enabled application, said speech processing engine providing a speech processing capability for the speech-enabled Web 2.0 application, and wherein at least one of the applied user-specific customization settings is a speech processing customization that affects a manner in which the speech processing engine performs a speech processing task.

7. The storage area of claim 6, wherein the Web 2.0 application is at least one of a WIKI and a BLOG, and wherein the Web 2.0 server is at least one of a WIKI server and a BLOG server.

8. The storage area of claim 6, wherein speech processing capabilities of the speech-enabled application are in accordance with voice markup of the speech-enabled application which is capable of being rendered by a standard browser.

9. A method for customizing Web 2.0 applications comprising:
establishing a connection to a Web 2.0 server using a browser;
conveying user identification information from the browser to the Web 2.0 server;
requesting a Web 2.0 application using the browser;
identifying a user based upon the identifying information;
querying a server-side data store for user-specific customization settings associated with the identified user and the requested Web 2.0 application using the Web 2.0 server;
discovering the user-specific customization settings in the server-side data store and applying the discovered customization settings to the Web 2.0 application; and
conveying the customized Web 2.0 application to the browser,
wherein the Web 2.0 application conforms to an Atom Publishing Protocol (APP) specification, and wherein the Web 2.0 application comprises an introspection document, a collection of entries, and a collection of resources, each of which conforms to the APP specification, wherein the applied user-specific customizations represent a modification to at least one of the entries and resources, and
wherein the Web 2.0 application is a speech-enabled application, and wherein at least one of the resources is a speech processing resource linked to a speech processing engine remotely located from the Web 2.0 server that serves the speech-enabled application, said speech processing engine providing a speech processing capability for the speech-enabled Web 2.0 application, and wherein at least one of the applied user-specific customizations is a speech processing customization that affects a manner in which the speech processing engine performs a speech processing task.

10. The method of claim 9, wherein applying the discovered user-specific customization settings is automatically performed by a customization engine, wherein the customization engine uses the customization settings to modify one or more entries of the Web 2.0 application.

* * * * *